United States Patent [19]
Freudenschuss et al.

[11] 4,179,191
[45] Dec. 18, 1979

[54] ADJUSTING MECHANISM FOR OPTICAL OBJECTIVE WITH LOST-MOTION ZONE

[75] Inventors: Otto Freudenschuss; Eduard Keznickl; Gottfried Patela, all of Vienna, Austria

[73] Assignees: Karl Vockenhuber; Raimund Hauser, both of Vienna, Austria

[21] Appl. No.: 851,353

[22] Filed: Nov. 14, 1977

[30] Foreign Application Priority Data

Nov. 15, 1976 [AT] Austria ............................. 8469/76

[51] Int. Cl.² .................. G02B 7/10; G02B 15/14; G02B 15/10
[52] U.S. Cl. .................................... 350/187; 350/255
[58] Field of Search ............... 350/187, 186, 184, 255

[56] References Cited
U.S. PATENT DOCUMENTS 3,970,368  7/1976  Von Belvard .................. 350/187
4,078,857  3/1978  Kantner et al. .................. 350/187

*Primary Examiner*—Jon W. Henry
*Attorney, Agent, or Firm*—Montague & Ross

[57] ABSTRACT

In order to establish a predetermined position of focusing or focal-length adjustment for an optical objective, a mechanism for the axial shifting of one or more lens members has a lost-motion zone in its operating range in which a continuing displacement of a control element does not change the focal length and/or distance of the objective. The halting of the lens shift (or, possibly, a compensatory displacement of an otherwise stationary lens member) can be brought about mechanically, with the aid of suitably shaped cam tracks, or electromechanically, via analog or binary position sensors. Arrival of the adjusting mechanism in the lost-motion zone may be signaled to the user by a detent, by a change in frictional resistance, or by a visual or acoustical indicator.

14 Claims, 13 Drawing Figures

ADJUSTING MECHANISM FOR OPTICAL OBJECTIVE WITH LOST-MOTION ZONE

FIELD OF THE INVENTION

Our present invention relates to a mechanism for adjusting an optical objective, for a camera or a projector, by shifting one or more lens members thereof along its optical axis to vary a parameter such as focusing distance or focal length.

BACKGROUND OF THE INVENTION

In conventional objectives, sharp focusing upon an object to be photographed is carried out by shifting or rotating a control element operatively coupled with a movable lens member whereby the latter is axially displaced. This lens member is often a front component of the objective, or part of such component, especially for focusing at normal distances between infinity and the so-called macro range generally defined as lying between the image-ratio limits of 1:10 and 1:1. To facilitate the taking of close-up pictures in this macro range, especially with a pancratic or varifocal objective having two fixed positive components and two movable negative components, one of these movable components (generally the second one) may be shifted while the other is held stationary; see, for example, commonly owned U.S. Pat. application Ser. No. 747,207 filed Dec. 3, 1976 by Walter Besenmatter et al, now U.S. Pat. No. 4,087,160.

With normal front-lens focusing, the usual distance scale engraved on a lens barrel will provide a sufficiently accurate reading inasmuch as—given a tolerable blur circle in the image plane—the objective will have a depth of field allowing minor positional deviations. With focusing in the macro range by the displacement of a more rearwardly located lens member, however, precise setting of that lens member becomes critical since the position of the object plane changes significantly even upon the slightest shifting of that member. To help the user find the proper setting for the taking of pictures in a predetermined object plane, e.g. for producing titles with an amateur motion-picture camera, it has heretofore been the practice to provide stops or detents (e.g. ball checks) indexing the control element in the correct position. The emplacement of the detent on the objective housing, however, involves unavoidable manufacturing tolerances which are difficult to compensate; such arrangements, therefore, are costly and of limited reliability.

Similar problems arise with conventional devices for indexing the shiftable components of a varifocal objective in a preselected position of focal-length adjustment.

OBJECT OF THE INVENTION

The object of our present invention, therefore, is to provide simple means for establishing a desired focusing or focal-length setting in an effortless manner and with a high degree of optical precision.

SUMMARY OF THE INVENTION

We realize this object, in accordance with our present invention, by operatively coupling one or more shiftable lens members with manual or automatic control means therefor via intermittently effective drive means holding the lens member or members stationary throughout at least one lost-motion zone which extends over a fraction of the range of adjustment of the control means.

There are several ways in which this temporary immobilization of a shiftable lens member can be achieved. One possibility is the physical decoupling of that lens member from its control element as it passes through the lost-motion zone; this, however, may allow the decoupled lens member to change its position spontaneously unless means are provided for holding it in place. Another solution would be the use of a special transmission, such as a crank drive or a Geneva gear. Where the shiftable lens member is displaced by an electric motor, its energizing circuit may be temporarily interrupted in response to a signal from an analog-type or digital position sensor, possibly with intervention of a microprocessor.

A particularly simple and advantageous mechanical solution utilizes a stationary or movable cam carrier, having at least one dwell of zero pitch (i.e., an edge portion parallel to the direction of motion), as part of the intermittently affective drive means. Such a cam carrier may be a slotted or grooved cylinder or plate of the type used in conventional varifocal objectives to shift the two movable components independently of each other. In that instance, the cam carrier according to our invention has a first and a second guide track engaged by respective cam followers rigid with the two movable components, these guide tracks having zero-pitch dwells concurrently engaged by their associated cam followers so that both components are held stationary simultaneously. The zero-pitch dwell of one guide track, generally the one for the first movable component, may be substantially longer than the corresponding dwell of the other guide track in order to define a focusing subrange adjoining a varifocal subrange, the zero-pitch dwell of the other guide track being engaged by its cam follower over only a fraction of that focusing subrange to define the lost-motion zone. In some instances we may provide more than one lost-motion zone in this subrange.

According to another feature of our invention, the arrival of the cam carrier in the lost-motion zone is indicated to the user by special position-sensing means preferably of the tactile type, such a coacting indexing formations on the cam carrier and on an adjoining surface (which could be part of the control element). Since the cam carrier may move relatively to the adjoining surface over considerable distance without changing the objective setting, a precise positioning of these indexing formations is no longer required. By the same token, a change in frictional resistance may signal that the desired focusing position (or focal-length setting) has been reached. Visual or audible indicators may also be used, especially with electromechanical control of the lens shift.

BRIEF DESCRIPTION OF THE DRAWING

The above and other features of our invention will now be described in detail with reference to the accompanying drawing in which.

SPECIFIC DESCRIPTION

Figure 1:
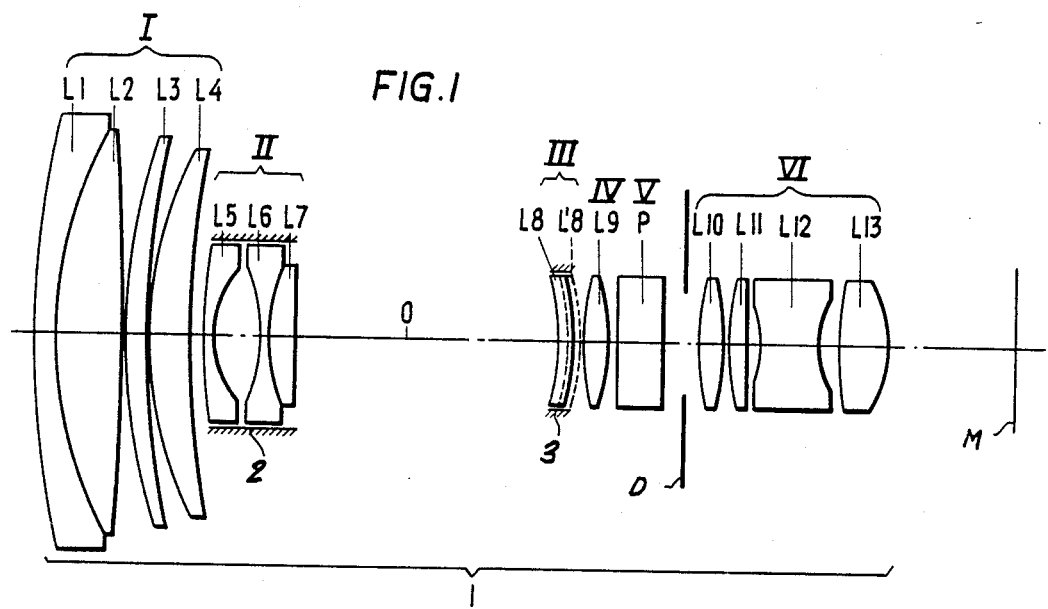
FIG. 1 diagrammatically shows a varifocal objective, of well-known type, adjustable in conformity with our invention.

In FIG. 1 we have shown a pancratic objective, generally designated 1, with a varifocal front group consisting of four components I–IV, a component V constituted by a reflex prism P, a diaphragm D, and a fixed-focus rear group VI. The image plane of objective 1 is shown at M.

Front component I is axially fixed and positively refracting, consisting of three lens members L1/L2, L3 and L4. Component II is shiftable along optical axis O and consists of two lens members L5, L6/L7 held in a lens mount 2. Component III is a single lens L8 of negative refractivity held in an axially shiftable lens mount 3. Component IV is an axially fixed positively refracting lens L9. Rear group VI is composed of four single lenses L10, L11, L12 and L13.

For adjustment of the focal length, with maintenance of a constant image plane M, components II and III are separately shifted as is well known per se. With lens L8 in the position L'8 illustrated in dotted lines, the objective shown in FIG. 1 is at the wide-angle end of its varifocal range. A shift of lens L8 into the solid-line position focuses the objective onto nearby objects for the taking of close-ups.

Figure 2:
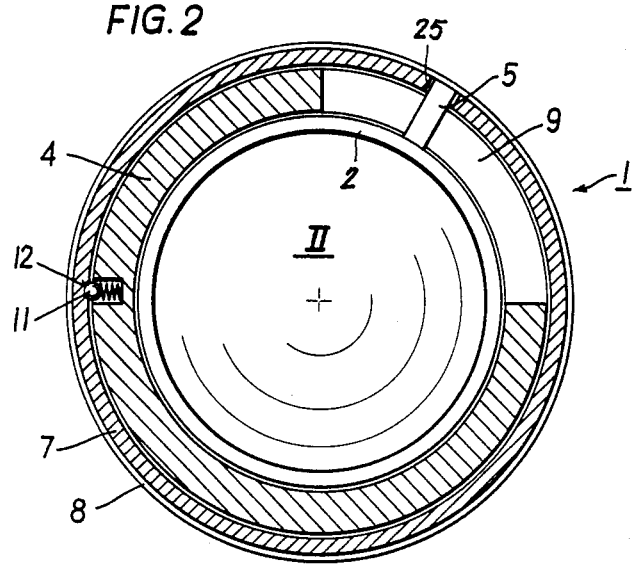
FIG. 2 is a cross-sectional view of the objective, drawn to a larger scale and showing a control ring and a camming sleeve included in its adjusting mechanism.
Figure 3:
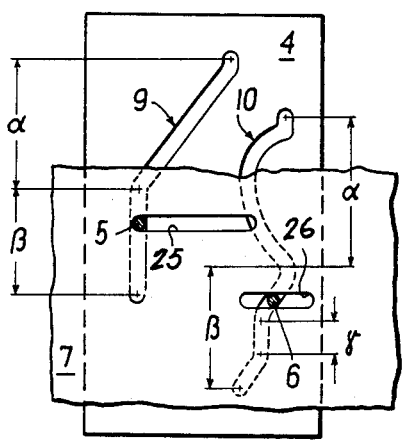
FIG. 3 is a developed view of the camming sleeve and part of the control ring of FIG. 2.

Lens mounts 2 and 3 carry cam-follower pins 5 and 6 which, as shown in FIGS. 2 and 3, traverse respective guide slots 9 and 10 of a camming sleeve 4 rigid with the otherwise non-illustrated objective housing or lens barrel. The pins 5 and 6 further engage in respective slots 25 and 26 of a control ring 7, axially fixed but rotatable about axis O, for entrainment thereby. Manual rotation of ring 7 is facilitated by a knurled periphery 8.

The guide track 9 for component II has a constant-slope section of angular extent $\alpha$, defining a varifocal subrange, and an adjoining dwell of zero pitch, i.e. a section located in a plane transverse to the optical axis, of angular extent $\beta$ defining a focusing subrange (at close-up distances). The guide track 10 for component III is of varying slope throughout the entire range $\alpha + \beta$, except for a short zero-pitch dwell of angular extent $\gamma$ corresponding to a minor fraction of subrange $\beta$. Curve section $\gamma$ defines a lost-motion zone since neither of these components moves during its engagement with pin 6, the other pin 5 simultaneously engaging the transverse section of curve 9. Thus, rotation of control ring 7 through the angle $\gamma$ does not cause any change in either the focal length or the position of the object plane of objective 1. This situation is indicated to the user by the engagement of a ball check 11 on sleeve 4 in a notch 12 on ring 7; the angular position of the ball check, within an arc of length $\gamma$, is not critical since it does not affect the setting of the objective.

Figure 4:
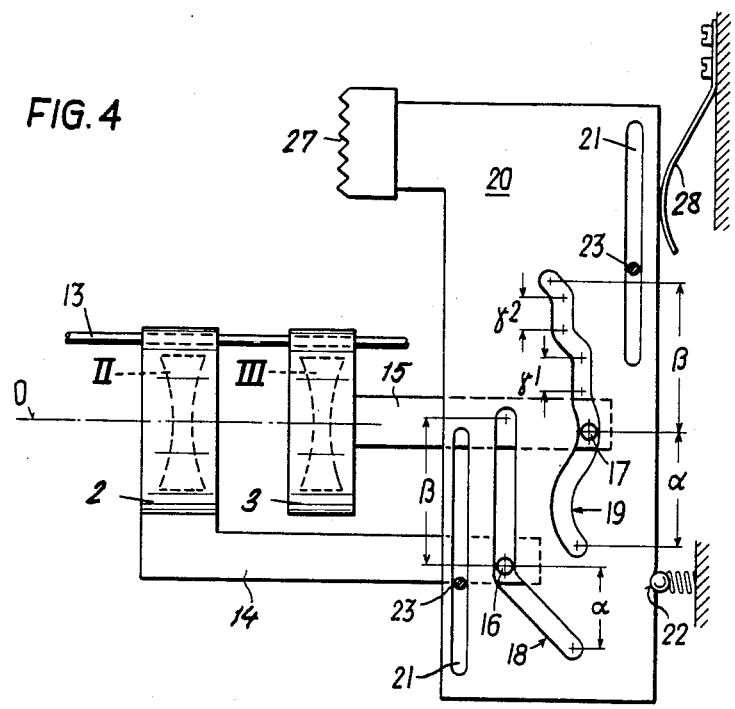
FIG. 4 is a diagrammatic developed view of a modified adjusting mechanism.

Whereas in FIGS. 2 and 3 the cam member 4 is stationary and the lens mounts 2, 3 rotate about axis O during adjustment, the reverse arrangement is possible as illustrated in FIG. 4. Here the two lens mounts are traversed by an axially extending guide rod 13, preventing their rotation, and are provided with extensions 14 and 15 carrying pins 16 and 17 engaging in respective slots 18 and 19 of a transversely shiftable cam plate 20. This plate, provided with a knurled control knob 27 to facilitate its displacement, has a pair of parallel guide slots 21 engaged by fixed pins 23 on the objective housing; any play in these slots is eliminated by the pressure of a ball check 22 and of a leaf spring 28 upon a longitudinal edge of plate 20, ball check 22 engaging in a notch of that edge in the illustrated position which represents the transition between varifocal subrange $\alpha$ and focusing subrange $\beta$. Plate 20 is also representative of the developed peripheral surface of an annular cam member, similar to ring 7 of FIGS. 2 and 3, centered on axis O. Curve 19 has two mutually separated zero-pitch dwells at $\gamma 1$ and $\gamma 2$ within section $\gamma$.

Figure 5A:
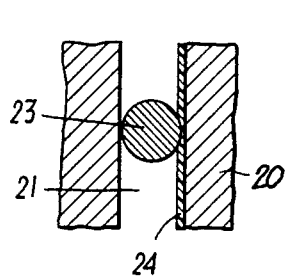
FIGS. 5A and 5B are enlarged detail views of part of the mechanism of FIG. 4 in two different positions.
Figure 5B:
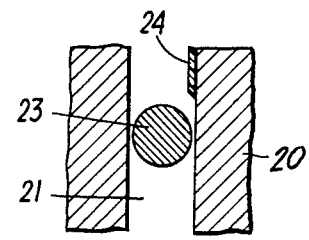

Although plate 20 could be provided with two further notches engageable by ball check 22 in the two lost-motion positions, i.e., with pin 17 received in the transverse stretch $\gamma 1$ or $\gamma 2$ of curve 19, we have shown in FIGS. 5A and 5B an alternate way of signaling to the user the arrival of component III in a desired focusing position. Thus, either or both slots 21 may be lined with a friction layer 24 in contact with pin 23 anywhere except along stretch $\gamma 1$ or $\gamma 2$, as seen in FIG. 5A; the manual displacement of plate 20 by the user, therefore, encounters a significant resistance. In the two zero-pitch zones the layer 24 is omitted, as seen in FIG. 5B, so that shifting is noticeably easier (albeit ineffectual). The thickness of layer 24 is taken into account in the shaping of curve 19, the additional play being eliminated by the biasing elements 22 and 28; the precise locations of the gaps of layer 24, however, are not critical for the reason already explained.

Figure 6:
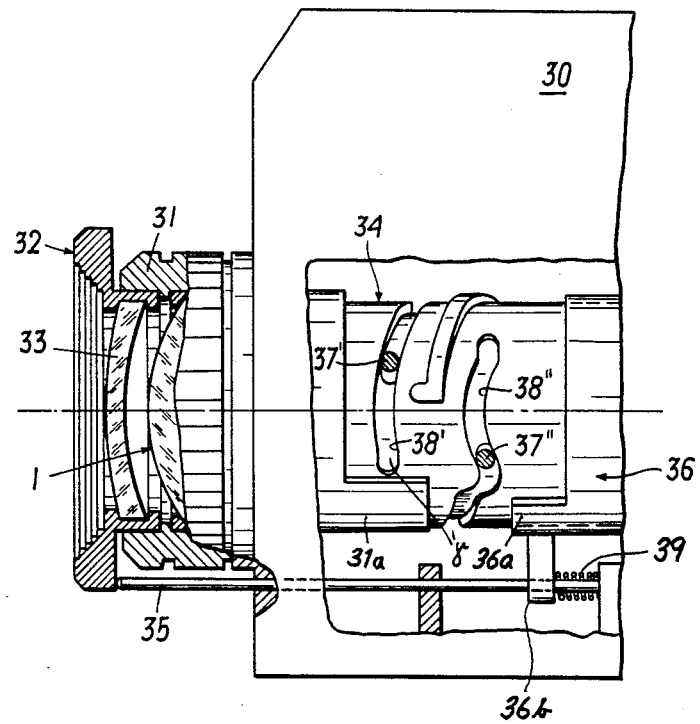
FIG. 6 is a side-elevational view (parts broken away) of a camera objective embodying our invention.

In FIG. 6 we have shown a motion-picture camera equipped with a lens-adjusting mechanism according to our invention. The camera body, partly illustrated at 30, carries a lens housing with a rotatable front ring 31 which accommodates an attachment 32 comprising a dispersive lens 33 positionable in front of the varifocal abjective 1. A camming sleeve 34 has grooves 38', 38", with zero-pitch dwells again indicated at $\gamma$, engaged by respective follower pins 37', 37" which are entrainable by horizontal slots in a non-illustrated extension of ring 31. A nonrotatable blocking sleeve 36 is axially slidable on camming sleeve 34 and has a ledge 36a which normally is held by a spring 39 against a fixed portion 31a of the lens housing, overlying the section $\gamma$ of curve 38" and preventing the displacement of the shiftable lens members into the lost-motion zone defined by that section within the focusing subrange $\beta$ (cf. FIG. 3). A push rod 35 rigid with a lug 36b of sleeve 36, engaged by spring 39, projects in that normal position beyond front ring 31 so as to be repressible into its illustrated position by the attachment 32 upon emplacement thereof in line with objective 1. Lens 33 forms a virtual intermediate image of an object in a plane located forwardly (i.e., to the left) of that lens, e.g. in its focal plane if the object is situated at infinity. For an extreme wide-angle or panoramic effect, therefore, the objective 1 can be focused in its lost-motion position on that forward plane after section γ of curve 38″ has been uncovered by repression of the rod 35 which acts as a feeler for the presence of attachment 32.

Figure 7:
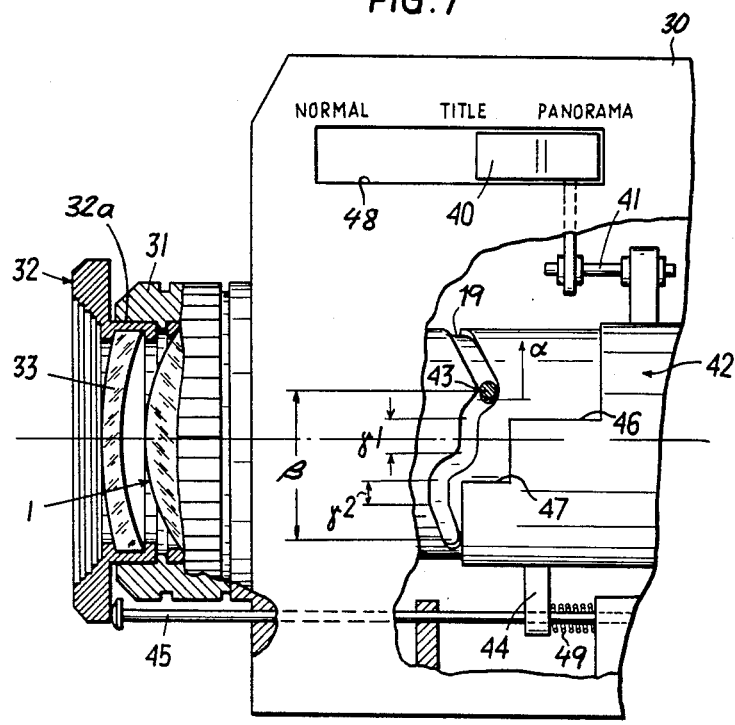
FIG. 7 is a view similar to FIG. 6, showing a modification.

FIG. 7 shows a similar arrangement in which, however, the interplay of a front attachment with a focusing control is reversed in that an emplacement of the attachment is possible only after a selector has been preset to permit focusing upon a predetermined object distance at close range. A slider 40, shiftable in a slot 48 of camera body 30, is connected by a linkage 41 with an axially displaceable blocking sleeve 42 having two axially and angularly staggered ledges 46 and 47. In a slider position designated NORMAL, designed for the taking of pictures beyond the macro range, ledge 46 cuts across cam groove 19 (here shown inverted with reference to FIG. 4) just above its dwell γ1 so as to allow focusing in only a part of the macro range. In another slider position, designated TITLE, ledge 46 unblocks the dwell γ1 yet ledge 47 still inhibits the shifting of the movable lens members into the position defined by dwell γ2. The latter position can be attained upon moving the slider 40 into a third position, designated PANORAMA, in which sleeve 42 is fully withdrawn from the path of a cam-follower pin 43 traversing the groove 19. A push rod 45, rigid with a lug 44 of sleeve 42, normally projects beyond front ring 31 so as to prevent the emplacement of any attachment thereon.

Figure 8:
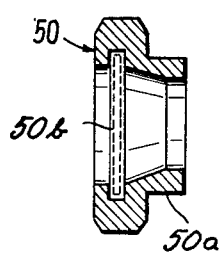
FIG. 8 is an axial sectional view, drawn to a smaller scale, of a front atachment for the objective of FIG. 7.

Besides the panoramic-lens attachment 32, shown emplaced in FIG. 7, another attachment 50 illustrated in FIG. 8 can be used with this camera. A comparison of the two attachments 32 and 50 (the latter being drawn to a much smaller scale) will show that attachment 50 has an axially extending neck 50a whose length substantially exceeds that of a corresponding neck 32a of attachment 32. Attachment 50, holding a title carrier 50b, can therefore be fitted into front ring 31 in the intermediate position of slider 40 in which the rod 45 projects farther to the left than in the extreme right-hand position of the slider, illustrated in FIG. 7. Thus, the intermediate slider position allows the filming of titles upon entrainment of pin 43 (by rotation of control ring 31) to dwell γ1 whereas the right-hand position permits the taking of panoramic views, with the aid of lens 33, upon further entrainment of the cam follower to dwell γ2.

Figure 9A:
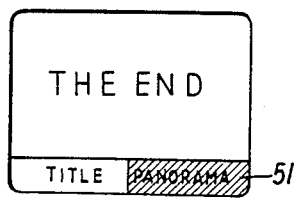
FIGS. 9A and 9B show different images appearing in a viewfinder of the camera of FIG. 7 in certain operating positions.
Figure 9B:
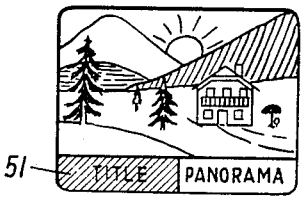

The position of slider 40 can also be indicated directly to the user by a coupling of linkage 41 with a shutter 51, FIGS. 9A and 9B, located in the light path of a viewfinder of the camera 30. In the intermediate slider position, as shown in FIG. 9A, the shutter obstructs a legend reading PANORAMA but uncovers another legend reading TITLE. In the right-hand slider position, as shown in FIG. 9B, the reverse is the case. In the left-hand slider position labeled NORMAL in FIG. 7, both legends are obscured. The shutter 51 could be mechanically operated but might also be represented by a pair of electro-optical light-control elements such as Kerr cells.

Figure 10:
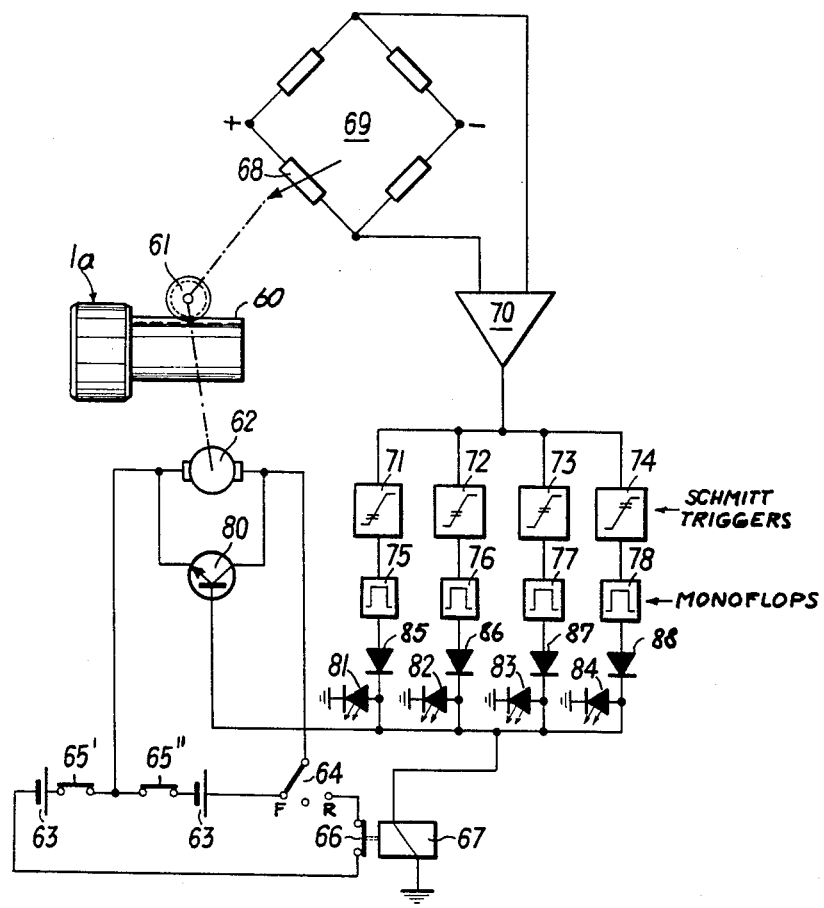
FIG. 10 is a circuit diagram of an electromechanical system for adjusting an objective in accordance with our invention.

We shall now describe, with reference to FIG. 10, an electromechanical system for establishing a number of lost-motion zones in a range of displacement of an axially shiftable lens mount 1a for a component of a focusable objective, e.g. its front member. Lens mount 1a is here shown provided with an extension which bears a rack 60 meshing with a pinion 61, the latter being coupled with a reversible electric motor 62 whose energizing circuit includes a pair of batteries 63, two limit switches 65′, 65″, a reversing switch 64 and a break contact 66 of a relay 67. A resistance bridge 69 has one arm formed by a potentiometer 68 whose slider is coupled with pinion 61. One bridge diagonal is connected across power supply 63 whereas its other diagonal is connected across the inputs of a differential amplifier 70. From a balanced or nearly balanced state in one limiting position of lens mount 1a, bridge 69 is progressively unbalanced upon a shifting of the lens mount to the other end of the adjustment range so as to develop progressively higher voltages in the output of amplifier 70.

Four threshold circuits 71-74, such as Schmitt triggers, are connected in parallel across this amplifier output and work into respective one-shot pulse generators, such as monoflops, 75-78. These trigger stages are connected in parallel, via respective diodes 85-88, to the winding of relay 67 as well as to the base of a transistor 80 shunting the motor 62. Each monoflop, when in its off-normal condition, also energizes a respective visual indicator such as a light-emitting diode 81-84.

With switch 64 in either of its two operative positions, i.e., "forward" (F) or "reverse" (R), motor 62 drives the pinion 61 to change the position of the object plane of the objective within its macro range. At a first predetermined point in that range, the output voltage of amplifier 70 is sufficient to trip the Schmitt trigger 71 whereupon monoflop 75 generates a pulse which actuates the relay 67 to break the motor circuit; the simultaneous saturation of shunt transistor 80 effectively cuts off the motor 62 (and could also operate a nonillustrated brake). The duration of this pulse is long enough to allow the user to open the switch 64 if the system is to remain in that position for an extended period.

In an analogous manner, trigger stages 72, 73 and 74 successively go into action upon the attainment of progressively higher voltage thresholds by the output of amplifier 70. The particular threshold, and therefore the specific stop position, is indicated to the user by the respective LED 81-84 which could be positioned in line with the viewfinder of the camera. Audible signals could also be produced, if desired, by sound generators in the outputs of monoflaps 75-78. The interruption of the lens shift, taking place while control switch 64 is held closed, may be considered a lost-motion operation.

The four stop positions established by trigger stages 71-74 could be so chosen that the first two lie in the macro range (e.g. at locations defined by the dwell γ1 and γ2 of FIGS. 4 and 7), the third one lies in an intermediate range (e.g. at a distance suitable for snapshots) and the fourth markings focusing at infinity. Furthermore, pinion 61 could be coupled with a control element such as ring 7 (FIGS. 2 and 3) or plate 30 (FIG. 4) to provide varifocal adjustment, as described above, with or without focusing control in the macro range. Also, a digital mode can be substituted for the analog mode of operation described above, with the use of a stepping motor to drive the pinion 61 and with replacement of Schmitt triggers 71-74 by binary pulse counters stepped by the source of driving pulses for that motor. In either instance the stop positions may be preprogrammed with the aid of servo drives for the establishment of selected voltage thresholds or pulse counts.

Figure 11:
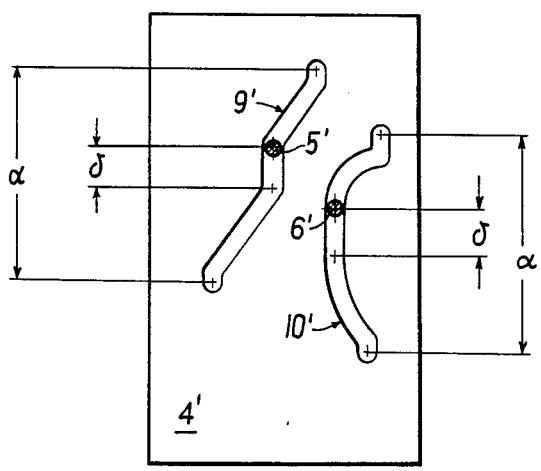
FIG. 11 is a developed view of a modified camming sleeve for the objective of FIG. 1.

In FIG. 11 we have illustrated a modified camming member 4′ (either a sleeve or a plate) with curves 9′ and 10′ engaged by respective cam-follower pins 5′ and 6′, these curves having zero-pitch dwells δ in an intermediate section of varifocal range α. The lost-motion zone defined by these dwells δ may represent a middle position of the varifocal group I–IV (FIG. 1) in which the magnification ratio of that group has a value of unity.

The front component I (or its first lens member LI/L2) of a varifocal objective 1 as shown in FIG. 1, whose negative components are shiftable by means of cam drives as described with reference to FIGS. 1–7 and 11, could be conventionally adjustable for focusing at normal range. Such cam drives, however, could also be used (like the electromechanical drive system of FIG. 10) for the intermittent shifting of a front lens or component with stop positions indexed by lost-motion zones.

The position-feeling or emplacement-blocking mechanism of FIGS. 6 and 7 is not part of our invention, except in combination with attachments 32 and 50; such a mechanism has been disclosed and claimed in application Ser. No. 711,835 filed Aug. 5, 1976 by Kurt Bohm et al. and assigned to a company affiliated with the assignee of our present application, now U.S. Pat. No. 4,110,005.

We claim:

1. An optical system comprising:
   a varifocal objective including lens means axially shiftable over a predetermined range of displacement including a first subrange for varying the focal length of the objective and a second subrange for varying the position of an object plane thereof;
   control means adjustable over a predetermined operating range corresponding to said range of displacement; and
   drive means operatively linking said control means with said lens means, said drive means positively connecting said control means with said lens means throughout said operating range except for at least one lost-motion zone coinciding with a predetermined position of said lens means in said second subrange in which said object plane lies at a certain close distance from the objective.

2. The system defined in claim 1 wherein said shiftable lens means comprises a first and a second component respectively displaceable by separate portions of said drive means, said portions being operative to immobilize said first component throughout said second subrange during axial shifting of said lost-motion zone.

3. The system defined in claim 1, further comprising position-sensing means coupled with said control means for indicating the arrival thereof at said lost-motion zone.

4. The system defined in claim 1 wherein said intermittently effective drive means comprises a cam carrier having at least one dwell of zero pitch.

5. The system defined in claim 4 wherein said shiftable lens means comprises a first and a second component, said cam carrier forming a first and a second guide track engaged by respective cam followers on said first and second components, said guide tracks having zero-pitch dwells concurrently engaged by their respective cam followers.

6. The system defined in claim 5 wherein the zero-pitch dwell of said first guide track defines a focusing subrange of said operating range corresponding to said second subrange and adjoining a varifocal subrange of said operating range corresponding to said first subrange, the zero-pitch dwell of said second guide track being engaged by its cam follower over only a fraction of said focusing subrange.

7. The system defined in claim 6 wherein the objective is part of a camera provided with an attachment positionable in front of said objective for the taking of pictures in a position of engagement of said cam followers with said zero-pitch dwells.

8. The system defined in claim 7 wherein the camera is provided with inhibiting means normally blocking a displacement of said control means into said focusing subrange, said inhibiting means being deactivable by said attachment upon emplacement thereof on said camera.

9. The system defined in claim 7 wherein the camera is provided with selector means for optionally blocking and unblocking a displacement of said control means into said focusing subrange, said selector means having an extension preventing the emplacement of said attachment on said camera in a blocking position.

10. The system defined in claim 9 wherein said second guide track has two zero-pitch dwells in a first and a second part of said focusing subrange, the camera being provided with a second attachment emplaceable thereon in said second part of said focusing subrange, said selector means having an intermediate position blocking access to only said second part of said focusing subrange while preventing emplacement of said second attachment only.

11. The system defined in claim 4, further comprising position-sensing means on said cam carrier and on an adjoining surface for indicating the arrival of said control means in said lost-motion zone.

12. The system defined in claim 11 wherein said position-sensing means comprises a pair of indexing formations on said cam carrier and on said adjoining surface.

13. The system defined in claim 11 wherein said position-sensing means comprises a pair of mating formations on said cam carrier and on said adjoining surface, one of said formations being a guide slot, the other of said formations being a projection received in said guide slot, the latter being provided with a friction layer engageable by said projection, said friction layer being omitted at a location corresponding to said lost-motion zone.

14. In an optical objective provided with axially shiftable lens means and with control means for varying an optical parameter of the objective, said control means being operatively coupled with said shiftable lens means for axially displacing same within a predetermined adjustment range,
   the improvement wherein the coupling between said control means and said shiftable lens means comprises intermittently effective drive means holding said shiftable lens means stationary throughout at least one lost-motion zone extending over a fraction of said adjustment range, said drive means including a cam carrier having at least one dwell of zero pitch,
   further comprising position-sensing means on said cam carrier and on an adjoining surface for indicating the arrival of said control means in said lost-motion zone, said position-sensing means including a pair of mating formations on said cam carrier and on said adjoining surface, one of said formations being a guide slot, the other of said formations being a projection received in said guide slot, the latter being provided with a friction layer engageable by said projection, said friction layer being omitted at a location corresponding to said lost-motion zone.

* * * * *